United States Patent [19]
Buchan et al.

[11] Patent Number: 5,267,096
[45] Date of Patent: Nov. 30, 1993

[54] ADJUSTABLE WRITE EQUALIZATION FOR TAPE DRIVES

[75] Inventors: William A. Buchan, Corona del Mar; Gregory A. Unruh, San Clemente, both of Calif.; Yinyi Lin, Chuang Hua, Taiwan

[73] Assignee: Archive Corporation, Costa Mesa, Calif.

[21] Appl. No.: 838,187

[22] Filed: Feb. 18, 1992

Related U.S. Application Data

[63] Continuation-in-part of Ser. No. 678,086, Mar. 29, 1991.

[51] Int. Cl.⁵ .................................. G11B 5/09
[52] U.S. Cl. ........................... 360/41; 360/25
[58] Field of Search ............... 360/25, 27, 39, 41, 360/46, 65

[56] References Cited

U.S. PATENT DOCUMENTS 4,618,941 10/1986 Linder et al. .................. 360/41 X Primary Examiner—David Mis
Attorney, Agent, or Firm—Roberts and Quiogue

[57] ABSTRACT

A write equalization circuit that includes a data encoder for producing a binary data signal wherein a 1 is represented by a transition at the start of a bit interval and a 0 is represented by no transition at the start of a bit interval, and a nominal pulse generating circuit for producing nominal equalization pulses respectively synchronized with predetermined 0's in the binary signal. Adjusting circuitry responsive to the binary data signal and the nominal equalization pulses produces a write data signal that includes equalization pulses having a width and location in bit intervals that remain substantially constant with changes in component delays due to changing temperature and voltage, wherein the constant width and location of the equalization pulses are selected to achieve a predetermined suppression characteristic.

10 Claims, 7 Drawing Sheets

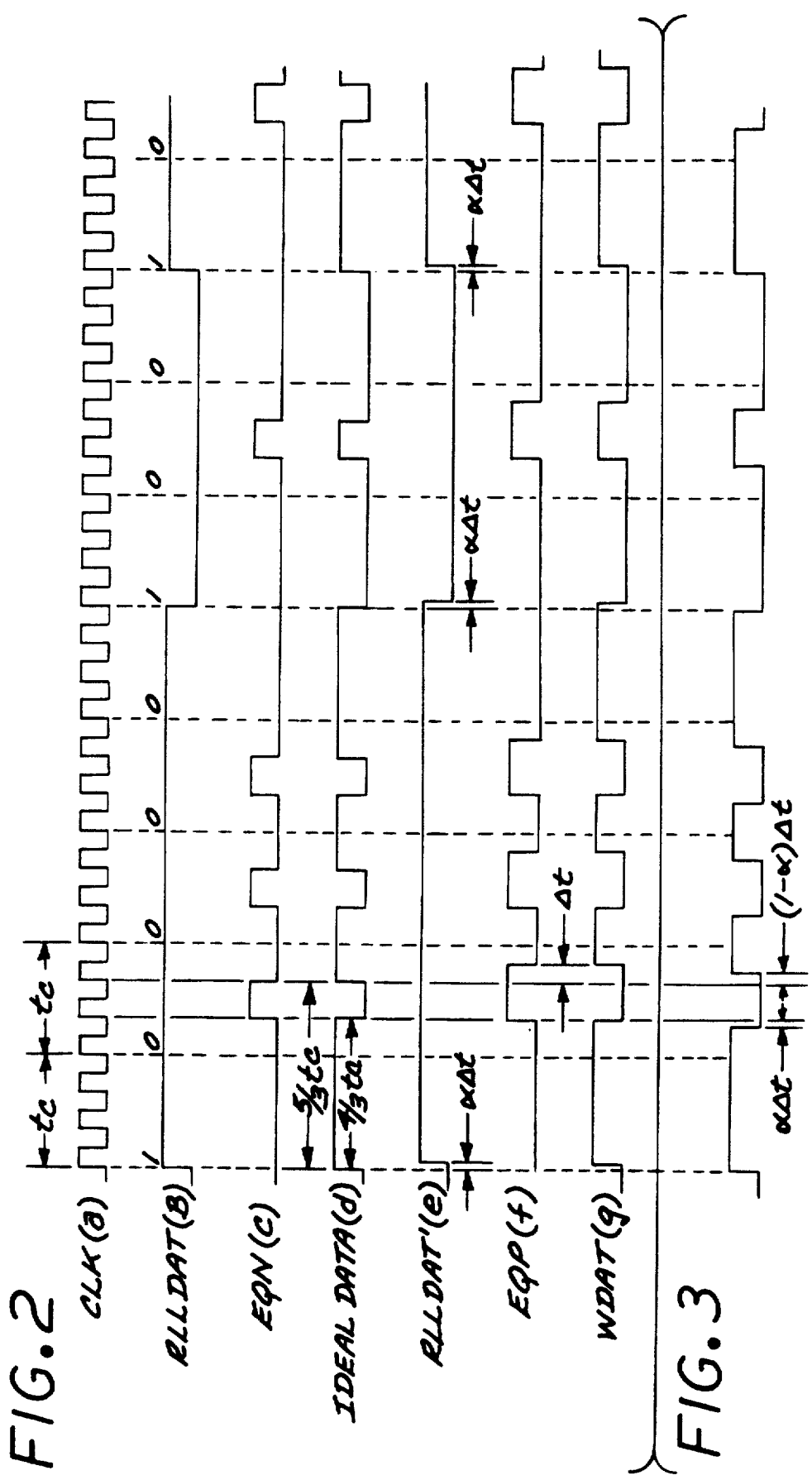

ADJUSTABLE WRITE EQUALIZATION FOR TAPE DRIVES

This is a continuation-in-part of U.S. application Ser. No. 07/678,086, filed Mar. 29, 1991.

BACKGROUND OF THE INVENTION

The subject invention is directed generally to computer data tape drives, and is directed more particularly to adjustable write equalization for computer data tape drives.

Computer data tape drives have been utilized for many years in the computer environment for "secondary" storage by which computer data on "primary" data storage, such as magnetic disk systems, could be periodically backed up or transported.

In the continuing quest for higher data densities, various coding techniques, recording techniques, and writing techniques have been developed over the years. Such developments have included write equalization for NRZI (non-return to zero, invert on ones) recording. Pursuant to NRZI recording, a binary 1 is written to tape pursuant to a transition in the write current level which causes a flux reversal, while a binary 0 is "written" by no transition in the write current level. The premise of NRZI is that data bits are supposed to be written at equally spaced intervals on tape, physically and in time.

As is well known, NRZI recording is typically implemented with run length limited (RLL) coding which limits the number of 0's that can occur in succession. Run length limited coding is generally depicted as RLL (d,k) coding, wherein k represents the maximum number of successive 0's permitted and d represents the minimum number of 0's between 1's and can have a value of 0. Thus, RLL codes having values of k that are relatively larger than d will have large transition spacing ratios (i.e., the ratio between the shortest and longest spaces between transitions). As is well known, relatively large transition ratios create various problems especially for the read circuitry, including for example saturation of magneto resistive read elements due to high values of low frequency flux.

A significant approach to solving the foregoing problems is the addition of equalization pulses to the write current during occurrences of strings of 0's, as described in "Write equalization in high-linear-density magnetic recording," Schneider, IBM J. RES. DEVELOP., Vol. 29, No. 6, November 1985, pages 563–568; "WRITE EQUALIZATION FOR GENERALIZED (d,k) CODES," Schneider, IEEE TRANSACTIONS ON MAGNETICS, Vol. 24, No. 6, pages 2533–2535, 1988; and the QIC-1350 Development Standard of the Quarter-Inch Cartridge Drive Standards, Inc. for SERIAL RECORDED MAGNETIC TAPE CARTRIDGE FOR INFORMATION INTERCHANGE.

The QIC-1350 Development Standard specifies that for every 0 other than the first 0 following a 1, a write equalization pulse is inserted. The width $t_w$ of the equalization pulse on tape is specified to be 1/6 of the minimum nominal transition period $t_c$ ($\pm 5\%$), where the transition period is the time between two adjacent flux transitions at the maximum recording density (i.e., the minimum time between the flux transitions as allowed by the particular RLL coding utilized). The QIC-1350 Development Standard utilizes RLL (1,7) coding, and therefore the width of the equalization pulse is $\frac{1}{6}$ of the nominal bit interval since the minimum time between flux transitions includes 2 bit intervals. For example, the equalization pulse width is 35.8 nanoseconds for a density of 38,750 flux transitions per inch (ftpi) at a tape speed of 120 inches per second (ips).

Typically, the write equalization pulses have been produced by inserting pulses of the specified width in the write current. However, as a result of non-linear distortions due to inadequate write current or head field rise times, demagnetization field effects from a prior transition, spacing loss, as well as other factors such as write head, write circuit, and tape variations, the equalization pulses recorded on tape are often narrower than the specified pulse width (but may, in general, also be effectively wider that the specified pulse width), and the suppression of low frequency components recorded on tape as specified by the write equalization specification is not being achieved. Tapes having insufficiently suppressed low frequency components may be unreadable since the effective resolution of the read head is inadequate. Tapes with oversuppression of these low frequency components may also be unreadable because of excessive resolution.

Circuitry for producing the write equalization pulses are commonly implemented with integrated circuits, and factors that affect the accuracy of the narrow equalization pulse width include processing variations as well as voltage and temperature effects. As a result of these factors, the equalization pulse width written by a particular circuit can easily be outside the tolerances specified for the equalization pulse width.

SUMMARY OF THE INVENTION

It would therefore be an advantage to provide a computer data tape drive write equalization circuit that is controlled to record write equalization pulses having the desired suppression.

Another advantage would be to provide a computer data tape drive write equalization circuit that is implemented with integrated circuits and compensates for integrated circuit processing variations as well as voltage and temperature effects.

The foregoing and other advantages are provided by the invention in a write equalization circuit that includes a data encoder for producing a binary data signal wherein a 1 is represented by a transition at the start of a bit interval and a 0 is represented by no transition at the start of a bit interval, and a nominal pulse generating circuit for producing nominal equalization pulses respectively synchronized with predetermined 0's in the binary signal. Adjusting circuitry responsive to the binary data signal and the nominal equalization pulses produces a write data signal that includes equalization pulses having a width and location in bit intervals that remain substantially constant with changes in component delays due to changing temperature and voltage, wherein the constant width and location of the equalization pulses are selected to achieve a predetermined suppression characteristic.

BRIEF DESCRIPTION OF THE DRAWINGS

The advantages and features of the disclosed invention will readily be appreciated by persons skilled in the art from the following detailed description when read in conjunction with the drawing wherein:

FIG. 2 schematically depicts waveforms of signals in the write equalization circuit of FIG. 1.

FIG. 3 schematically depicts a shifted version of the waveform of the write signal produced by the circuit of FIG. 1 which includes RLL data and equalization pulses, and is helpful in understanding the control of the width and location of equalization pulses provided by the circuit of FIG. 1.

DETAILED DESCRIPTION OF THE DISCLOSURE

Figure 1:
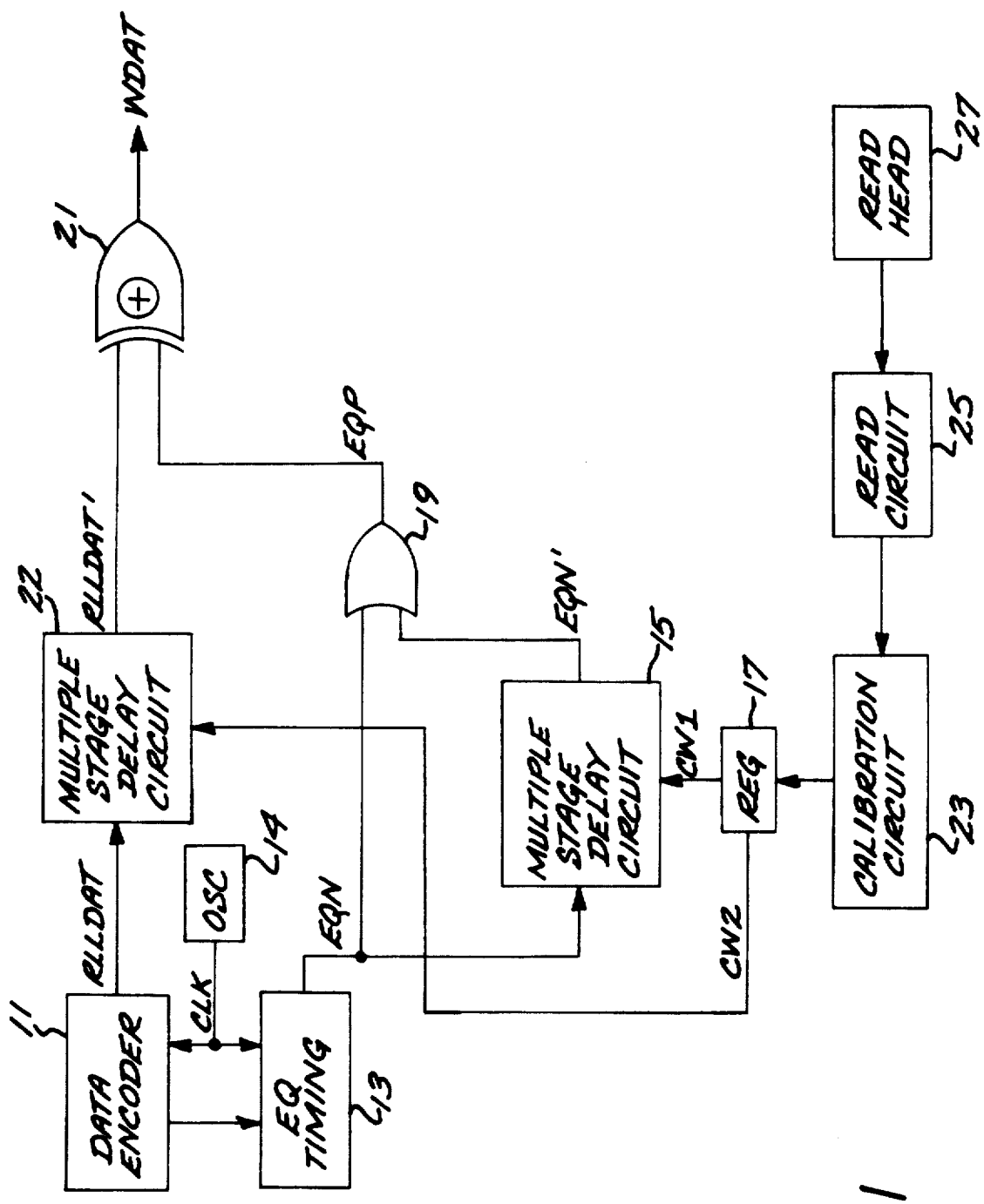
FIG. 1 is a block diagram of a write equalization circuit in accordance with the invention.

In the following detailed description and in the several figures of the drawing, like elements are identified with like reference numerals.

Referring now to FIG. 1, set forth therein is a write pulse equalization circuit that includes a data encoder 11 that encodes data to be written to tape into NRZI data in accordance with the RLL code utilized to provide a two level signal RLLDAT wherein a transition at the beginning of a bit interval represents a 1, and no transition at the beginning of a bit cell represents a 0. The waveform (b) in FIG. 2 represents the RLLDAT output of the data encoder 11 for the example of a valid data pattern of 01000010010 for the code being used.

An equalization pulse timing circuit 13 provides a 2 level signal EQN containing nominal equalization pulses which are timed relative to the RLLDAT output in accordance with the particular equalization specification being implemented. For example, for the QIC-1350 Development STANDARD, an equalization pulse is provided for each 0 other than the last 0 preceding a 1, with the pulse being centered in the bit interval of the associated 0 and having a nominal width of $t_c/3$, where $t_c$ is the bit interval or period. The waveform (c) in FIG. 2 represents the EQN output of the equalization pulse timing circuit 13 for the example RLLDAT output data pattern 010000110010 represented by the waveform (b) of FIG. 2.

The data encoder 11 and the equalization timing circuit 13 are commonly clocked by a clock signal CLK provided by a crystal oscillator clock source 14, and the waveform (a) of FIG. 2 depicts the CLK output in relation to the other waveforms of FIG. 2. By way of illustrative example, the clock signal CLK has a period equal to the nominal width of an equalization pulse $t_c/3$, which would provide synchronization between the equalization pulses and the bit intervals, each of which would be defined by three periods of the CLK signal. Thus, each data transition of the RLLDAT signal and the transitions of the nominal equalization signal EQN would be defined by clock edges. The waveform (d) of FIG. 2 illustrates the ideal data signal that would result from combining RLLDAT with EQN, with appropriate inversion of the EQN pulses when RLLDAT is at a logical high. It should be appreciated that although in the foregoing illustrative example the width of EQN pulses is substantially equal to the nominal pulse width defined by a particular Development Standard, the width of the EQN pulses can be less than the nominal pulse for greater flexibility. Moreover, different suppression requirements can be implemented with different clock frequency to highest data frequency ratios, and the subject invention is applicable to such different suppression requirements.

In accordance with the invention, the RLLDAT signal is controllably delayed to produce a delayed data signal RLLDAT' and the EQN signal is utilized to generate an equalization signal EQP having pulses whose trailing edges can be controllably stretched or extended relative to the trailing edges of the EQN pulses. The combination of the delayed data signal RLLDAT' and the equalization signal EQN' provides a write data signal WDAT having equalization pulses that are (a) wider than the nominal pulses of the EQN signal and (b) controllably positioned in their respective bit intervals, for example with their trailing edges being further from the bit interval center than the leading edges. Pursuant to control of the equalization pulse width and position, the information written to tape substantially conforms to the ideal data as represented by the waveform (d) in FIG. 2.

The EQN signal output of the equalization timing circuit 13 is provided to a multiple stage delay circuit 15 whose output EQN' is a delayed version of the EQN signal. By way of illustrative example, the multiple stage delay circuit 15 comprises a variable delay tree. The number of delay stages utilized to produce the delayed signal EQN' is determined by a control word CW1 in a control register 17.

The multiple stage delay circuit 15 is built from logic gates in an integrated circuit such that the total delay through the tree is:

$$\sum_{n=0}^{CW1} d_n \approx CW1 \cdot d \qquad \text{(Equation 1)}$$

where $d_n$ is the delay added by each additional gate n gated into the delay path. All respective delays $d_n$ can be implemented to be approximately equal, and each elemental delay $d_n$ can be described by the equation:

$$d_n = d_{n(nom)} \cdot K \qquad \text{(Equation 2)}$$

where $d_{n(nom)}$ is the delay of each delay gate under nominal process, temperature and voltage, and K is a factor which expresses the proportional change in delay for all gates within the same integrated circuit under actual present conditions of process, voltage and temperature. The total delay $\Delta t$ may be expressed, therefore, as:

$$\Delta t = \sum_{n=0}^{CW1} d_{n(nom)} \cdot K \approx CW1 \cdot d_{(nom)} \cdot K \qquad \text{(Equation 3A)}$$

The EQN signal output of the equalization timing circuit 13 is further provided to an OR circuit 19 which also receives the delayed version EQN' as an input. The output EQP of the OR circuit 19 includes equalization pulses, the lengths of which are controlled by the delay provided by the multiple stage delay circuit 15, as determined by the value of the control word CW1 in the control register 17. In particular, the timing of the trailing edges relative to the respective leading edges is controlled by the multiple stage delay circuit 15 pursuant to the control word CW1. By ORing the EQN signal with its delayed version EQN', the EQP signal contains equalization pulses that are wider than the EQN pulses by $\Delta t$.

The RLLDAT output of the data encoder circuit 11 is provided to a multiple stage delay circuit 22 whose output RLLDAT' is a delayed version of RLLDAT, and is represented by the waveform (e) of FIG. 2 for the RLLDAT output data pattern 01000010010. The multiple stage delay circuit 22 is implemented in the same integrated circuit as the multiple stage delay circuit 15 and is substantially similar to the multiple stage delay circuit 15, so that both circuits have substantially the same delay characteristics and the gate delays of both delay circuits are substantially the same. The number of delay stages utilized to produce the delayed signal RLLDAT' is controlled pursuant to a control word CW2 in the control register 17, and the total delay $\alpha\Delta t$ provided by the multiple delay circuit 22, may be expressed as follows by analogy to Equation 3A above:

$$\alpha\Delta t = \sum_{n=0}^{CW2} d_{n(nom)} \cdot K \approx CW2 \cdot d_{(nom)} \cdot K \quad \text{(Equation 3B)}$$

where $\alpha$ defines the location of the equalization pulses within the bit intervals and will be discussed in detail further herein.

The EQP output of the OR circuit 19 is provided as one input to an EXCLUSIVE-OR circuit 21. The other input to the EXCLUSIVE-OR circuit 21 is provided by the output RLLDAT' of the multiple stage delay circuit 22. The WDAT output of the EXCLUSIVE-OR circuit 21 is a 2 level signal and, for the example data pattern 01000010, is represented by the waveform (g) of FIG. 2.

In the foregoing, the equalization pulses of the EQP signal provided by the OR circuit 19 are of a predetermined polarity (e.g., positive wherein the leading edges are positive going), and the EXCLUSIVE-OR circuit 21 produces equalization pulses of the appropriate polarity for the particular level of the RLLDAT' that happens to represent successive 0's. Thus, if the RLLDAT' is low for certain successive 0's, the equalization pulses in WDAT will be positive going for those 0's. If RLLDAT' is high for certain successive 0's, the equalization pulses in WDAT will be negative going (i.e., negative going leading edges) for those 0's.

As a result of delaying the RLLDAT data signal, the 1's transitions in the write data signal WDAT have been delayed relative to the ideal data 1's transitions by $\alpha\Delta t$, and the bit intervals of the delayed RLLDAT' data signal are effectively delayed by $\alpha\Delta t$ relative to the bit intervals of the RLLDAT data signal. As a result of extending the equalization pulse trailing edges, the leading edges of the equalization pulses of the write data signal WDAT are aligned with the ideal data equalization pulse leading edges, while the trailing edges of the equalization pulses of the write data signal WDAT have been delayed by $\Delta t$ relative to the ideal data equalization pulse trailing edges. In terms of the shifted bit intervals defined by the delayed RLLDAT' data signal, since the time between the leading bit interval boundary and the equalization pulse leading edge has been reduced by $\alpha\Delta t$, the leading edges of the equalization pulses of the write data signal WDAT are advanced by $\alpha\Delta t$ relative to the center of the bit interval (i.e., the leading edges precede the bit interval center by one-half the nominal width plus $\alpha\Delta t$). Since the equalization pulses were extended by $\Delta t$ relative to their nominal width, and since the equalization relative to the bit interval center as defined by the delayed RLLDAT' data signal, the equalization pulse trailing edges are delayed by $(\Delta t - \alpha\Delta t)$ relative to the bit interval center as defined by the delayed RLLDAT' signal (i.e., the trailing edges are delayed relative to the bit interval center by one-half the nominal width plus $(\Delta t - \alpha\Delta t)$). The delay $(\Delta t - \alpha\Delta t)$ can be rewritten as $(1-\alpha)\Delta t$, and therefore $\alpha$ represents the fractional amount of the equalization pulse widening that is applied to the leading edge of the equalization pulses of the write data signal WDAT. If $\alpha$ is constant for a given system implementation, then it should be appreciated that the relation between the control words for the multiple stage delay circuits 15, 22 is CW2 = $\alpha$CW1, since CW1 defines the total widening, and CW2 defines the amount of widening applied to the equalization pulse leading edges.

The effective advance of the equalization pulse leading edges and delay of the equalization pulse trailing edges resulting from delaying the RLLDAT relative to the extended pulses EQP can be further appreciated from FIG. 3 which is the result of shifting the write data signal WDAT waveform (g) of FIG. 2 to the left by $\alpha\Delta t$.

By way of illustrative example of the QIC 1350 standard wherein the ideal write data equalization pulse is centered in the bit interval and has a width of $t_c/3$, where $t_c$ is the bit interval, the leading edge of an equalization pulse in the write data WDAT occurs $[(t_c/6) + \alpha\Delta t]$ before the center of the associated bit interval as defined by the delayed data signal RLLDAT', and the trailing edge of such equalization pulse occurs $[(t_c/6) + (1-\alpha)\Delta t]$ after the center of the associated bit interval.

The allocation of equalization pulse widening to the equalization pulse leading and trailing edges is based on magnetic deficiencies in the tape write head and the tape media as to their capabilities for recording closely spaced transitions in the ideally correct locations relative to each other, where such deficiencies are intended to be compensated by widening of the equalization pulse width. Generally, three problems result from the deficiencies:

(1) The demagnetization field from an existing transition on the tape causes an adjacent transition to be written closer than expected to the existing transition. As this effect increases, the spacing between two adjacent transitions becomes closer, but it can be reduced by moving the trailing edge of the write current pulse further away from the leading edge until the effective suppression reaches the desired level.

(2) High frequency information is lost due to spacing between the write head and the tape. This can be compensated by widening the equalization pulses and maintaining them centered in their nominal location (i.e., at the center of the bit intervals).

(3) High frequency information is lost due to inadequate frequency response in the write head. For example, permalloy cores show significant degradation compared to ferrite or amorphous cores because of eddy current losses. This problem also can be compensated by widening the equalization pulses while maintaining them centered in their nominal location.

For many applications, the contributions from problems (2) and (3) are relatively small, and the phase errors due to shifting only one edge of the equalization pulses are negligible (i.e., $\alpha$ can be zero). For other applications, there is a need to shift both leading and trailing edges, but the trailing edge will typically require more movement relative to the center of the bit interval than the leading edge due to the effect of problem (1).

For a given system application, it can be expected that the ratio of leading edge movement ($\Delta t_L$) to trailing edge movement ($\Delta t_T$) will be substantially constant, and therefore will be substantially constant for a given system implementation since it can be demonstrated that $\alpha = R/(R+1)$ where $R = (\Delta t_L/\Delta t_T)$. The substantially constant factor $\alpha$ for a given system implementation can be determined empirically as follows. First, low frequency data comprising the lowest frequency of transitions for the particular RLL code implemented (i.e., transitions separated by the maximum number of successive 0's) is written without equalization pulses, and the phase-frequency relation of the read head output signal is determined. The same low frequency data is then written repeatedly with equalization pulses, initially with nominal width pulses centered in the bit intervals, and then with varying leading edge and trailing edge locations to determine those leading edge and trailing edge locations which achieve the appropriate suppression level while maintaining the same phase-frequency relationship as was obtained without equalization pulses. In general, leading edge movement ($\Delta t_L$) will be different from the trailing edge movement ($\Delta t_T$). From the empirically determined leading and trailing edge movements, the total pulse widening $\Delta t = \Delta t_L + \Delta t_T$, and $\alpha = \Delta t_L/(\Delta t_L + \Delta t_T)$ since $\alpha$ is the fractional amount of the total pulse widening that is applied to the leading edge.

The values of the control word CW1, CW2 in the control register 17 are set by a calibration circuit 23. Initially, pursuant to manufacture or when a tape is to be written, the calibration circuit 23 operates to calibrate the write circuitry to compensate for tape head and tape media magnetic deficiencies described previously by determining a desired steady state constant equalization pulse width and location. During steady state operation, the calibration circuit operates to compensate for drift due to voltage and temperature variations so that the desired equalization pulse width and location are maintained.

The initial equalization pulse calibration determines a reference control value CW1$_o$ for the reference control word CW1 that produces a desired playback characteristic, such as a predetermined suppression of a fundamental component defined by the lowest frequency (or some other convenient frequency) of transitions in the data written to tape with predetermined phase characteristics. As known by persons skilled in the art, the predetermined phase and suppression characteristic of any frequency relative to a reference frequency are typically defined in the development standard with which the particular implementation is intended to conform. In this example, the desired playback characteristic is defined by a predetermined suppression of the lowest frequency data signal allowed by the particular RLL code utilized relative to the highest frequency data signal allowed by the RLL code utilized.

By way of illustrative example, the initial equalization pulse calibration can be achieved, for example, by writing test patterns to tape and varying the control word CW1 until the desired playback characteristics are achieved. The particular value of the control word CW1 that achieves the desire playback characteristics is stored as the reference control word CW1$_o$ which is utilized during steady state operation to arrive at the control word CW1 which in turn is multiplied by $\alpha$ to arrive at CW2, where $\alpha$ has been determined for the particular implementation. The control words CW1 and CW2 will vary with changes in propagation delay characteristics of the implementation of the delay circuit 15 and the delay circuit 22 due to temperature and voltage variations. In this manner, the EQP signal provides equalization pulses that remain substantially constant in width and location with variations in voltage and temperature for a given initial equalization pulse calibration.

Figure 4:
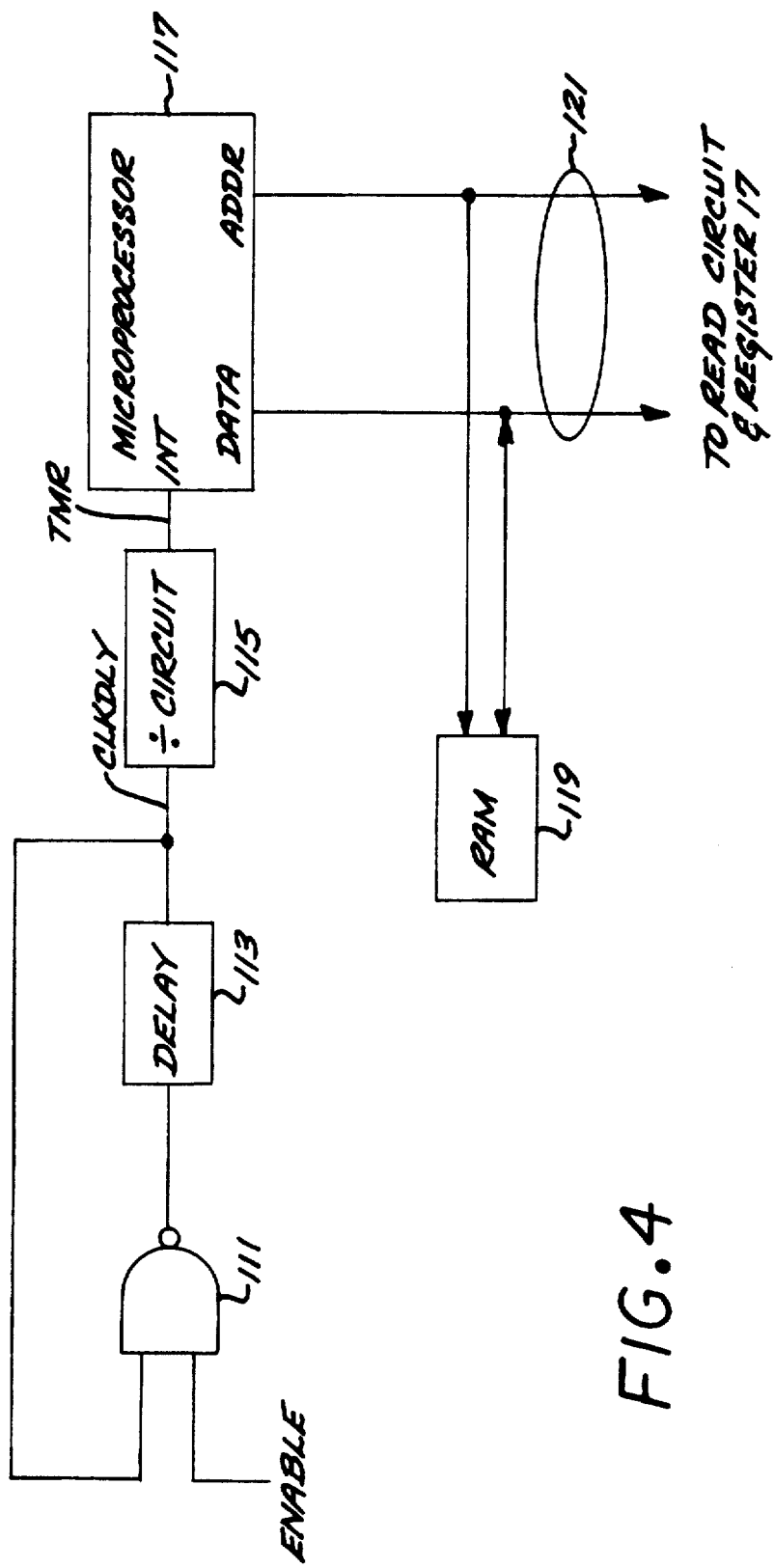
FIG. 4 is a schematic block diagram of an illustrative example of an implementation of the calibration circuit of the write equalization circuit of FIG. 1.

Referring now to FIG. 4, set forth therein is a block diagram of an illustrative example of an implementation of the calibration circuit 23 which comprises an enable gate 111 and delay circuitry 113 constructed from a number of logic buffers connected in series and responsive to the enable gate 111. The output CLKDLY of the delay circuitry 113 is fed back to the enable gate 111 and comprises the frequency output of a ring oscillator formed by the enable gate 111 and the delay circuitry 113. The frequency output CLKDLY of the ring oscillator is provided to a divide circuit 115 whose output TMR is a reduced frequency version of CLKDLY. The divide circuit output TMR is provided to the counter input TMRIN of a microprocessor 117 which is configured to detect the frequency of the TMR signal. A random access memory 119 for data storage is accessed by the microprocessor 117 via address and data busses 121.

The enable gate 111 and the delay circuitry 113 forming a ring oscillator are implemented in the same integrated circuit as the variable stage delay circuits 15, 22 for example in a gate array, so that such circuitry will have substantially the same propagation delay characteristics. The frequency of operation of the ring oscillator is a function of the process, voltage and temperature factors of the integrated circuit, and therefore changes in the ring oscillator frequency provide an indication of drift in the voltage and temperature factors of the integrated circuit. Such changes in the ring oscillator frequency are utilized as follows to control the value of the control words CW1, CW2 which determine the respective numbers of enabled delay stages in the variable stage delay circuits 15, 22.

The frequency of oscillation FR of the ring oscillator (111, 113) is:

$$FR = 1/(t_{rE} + t_{rD} + t_{fE} + t_{fD}) \qquad \text{(Equation 4)}$$

where $t_{rE}$ and $t_{fE}$ are the rise and fall delays of the enable gate 111, and $t_{rD}$ and $t_{fD}$ are the rise and fall delays of the delay circuit 113. Since these elements are implemented in the same integrated circuit as the multiple stage delay circuits 15, 22 they are affected by the same factor K as the elements of the delay trees of the delay circuits 15, 22, so that:

$$FR = 1/(t_{rE(nom)} \cdot K + t_{rd(nom)} \cdot K + t_{fE(nom)} \cdot K + t_{fD(nom)} \cdot K) \qquad \text{(Equation 5)}$$

-continued $$= 1/K(t_{rE(nom)} + t_{rd(nom)} + t_{fE(nom)} + t_{fD(nom)}) \quad \text{(Equation 6)}$$

From Equation 6, the oscillation frequency $F_{nom}$ when all of the delays are nominal can be expressed as:

$$FR_{nom} = (t_{rE(nom)} + t_{rd(nom)} + t_{fE(nom)} + t_{fD(nom)}) \quad \text{(Equation 7)}$$

Substituting Equation 7 into Equation 6 provides the following expression for the oscillation frequency FR:

$$FR = FR_{nom}/K \quad \text{(Equation 8)}$$

The factor K applies equally to the elements of the delay circuits 15, 22 and the ring oscillator, regardless of the exact type of gates used, even if each is implemented with a different type of gate. Care must be taken, however, when designing the IC so that very slow rise and fall times are not produced which can cause the delay elements not to follow this simple linear equation. Thus, changes in frequency can be measured by the microprocessor 117 and used to adjust the control words CW1, CW2 so that the width and location of the equalization pulses remain constant.

In operation, the ring oscillator is enabled by providing a LO enable signal for sufficient time to allow any LO states in the delay circuit to be removed, and then providing a HI enable signal which will cause the ring oscillator to oscillate.

Pursuant to an initial equalization pulse calibration procedure, the calibration circuit determines a reference control value $CW1_o$ for the control word CW1 that produces the desired equalization, such as a predetermined suppression in the lowest fundamental frequency which is determined by the lowest frequency of transitions for the particular RLL code implemented (i.e., maximum successive 0's). When the reference control value $CW1_o$ is determined, the calibration circuit detects the frequency of operation of the ring oscillator which is stored as reference frequency $FR_o$. An illustrative example of an initial calibration procedure will be described further below.

In steady state operation, the reference control value $CW1_o$ and the reference frequency $FR_o$ are utilized in conjunction with the actual ring oscillator frequency to adjust the control words CW1 and CW2 to compensate for drift so that the width and location of the equalization pulses remain substantially constant. Essentially, during steady state operation the calibration circuit indirectly detects changes in the propagation delay characteristics of the multiple stage delay circuits 15, 22 by directly detecting changes in the propagation delay characteristics of the delay circuit of the ring oscillator, and changes the respective numbers of enabled delay stages in the multiple stage delay circuits 15, 22 in order to compensate for the changes in the propagation delay characteristics.

Figure 5:
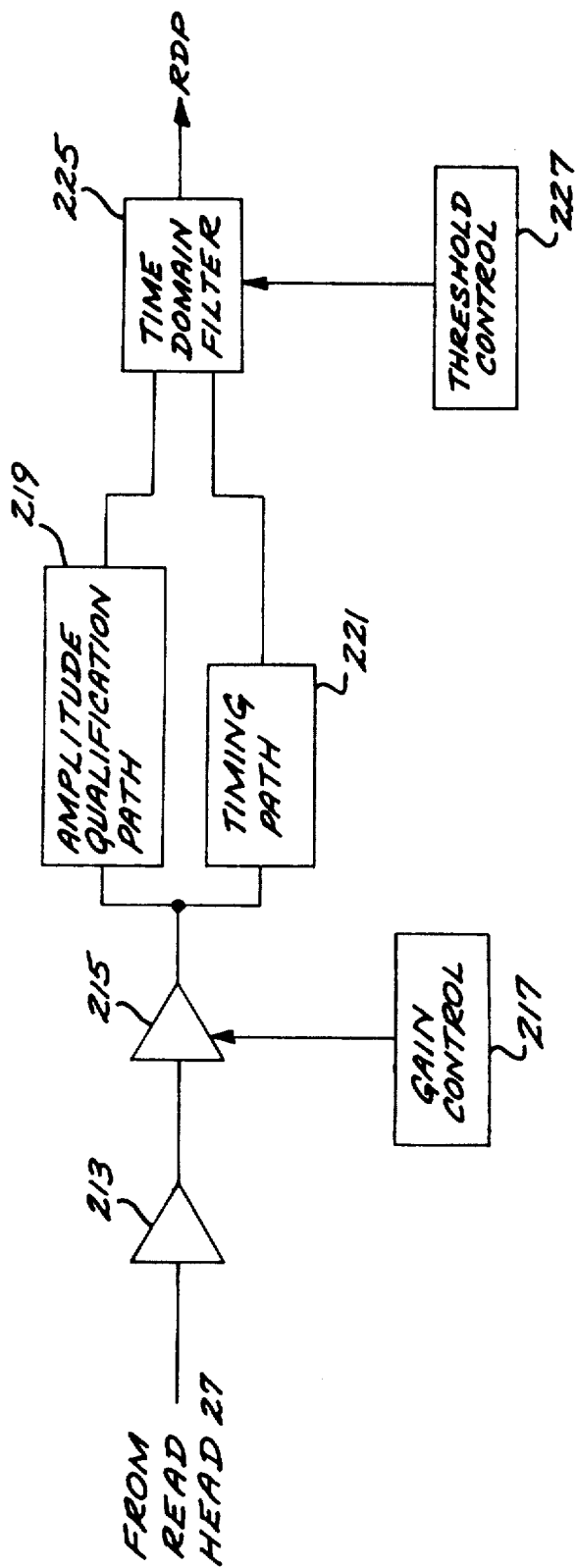
FIG. 5 is a schematic block diagram of a tape read circuit which can be utilized with the calibration circuit of FIG. 4.

Referring now to FIG. 5, set forth therein is a block diagram of a typical read circuit with which the calibration circuit can be utilized. The output of the read head 27 (FIG. 1) is amplified by a preamplifier 213 and a variable gain amplifier 215 whose gain is controlled by a gain control circuit 217. The output of the variable gain amplifier 215 is directed to two parallel channels: an amplitude qualification channel 219 and a timing channel 221. The amplitude qualification signal and the timing signal provided by the two channels are provided in parallel to a time domain filter 225 which has a variable threshold that is controlled by a threshold control circuit 227. The time domain filter provides an output signal RDP which contains pulses representative of each of the "1" transitions read by the read head 27.

The timing channel 221 differentiates the output of the variable gain amplifier 215 and provides a trigger to the time domain filter 225 corresponding to the transitions in the read data stream with additional pulses created in the middle of long strings of zeroes in the read data stream. The amplitude qualification channel 219 uses the output of the variable gain amplifier 215, as appropriately filtered, and provides a signal which is used by the time domain filter 225 to distinguish between (a) transitions that correspond to the NRZI ones and (b) transitions added by the timing channel.

As is known, the time domain filter essentially detects when the timing input crosses zero, delays a predetermined amount, and then examines the amplitude qualification signal as to whether or not it has exceeded one of two threshold levels that are on either side of a reference by equal amounts. Such threshold levels can be considered as a positive threshold and a negative threshold, and an RDP pulse is produced only under the following conditions:

(a) the amplitude qualification signal increases so as to cross the positive threshold and is above the threshold at a predetermined time after the timing path signal has crossed 0 in the positive direction, and the prior RDP pulse was produced by the amplitude qualification signal exceeding the negative threshold as described in condition (b); or (b) the amplitude qualification signal decreases so as to cross the negative threshold and is below the threshold for at a predetermined time after the timing path signal has crossed 0 in the negative direction, and the prior RDP pulse was produced by the amplitude qualification signal exceeding the positive threshold as described in condition (a).

Figure 6:
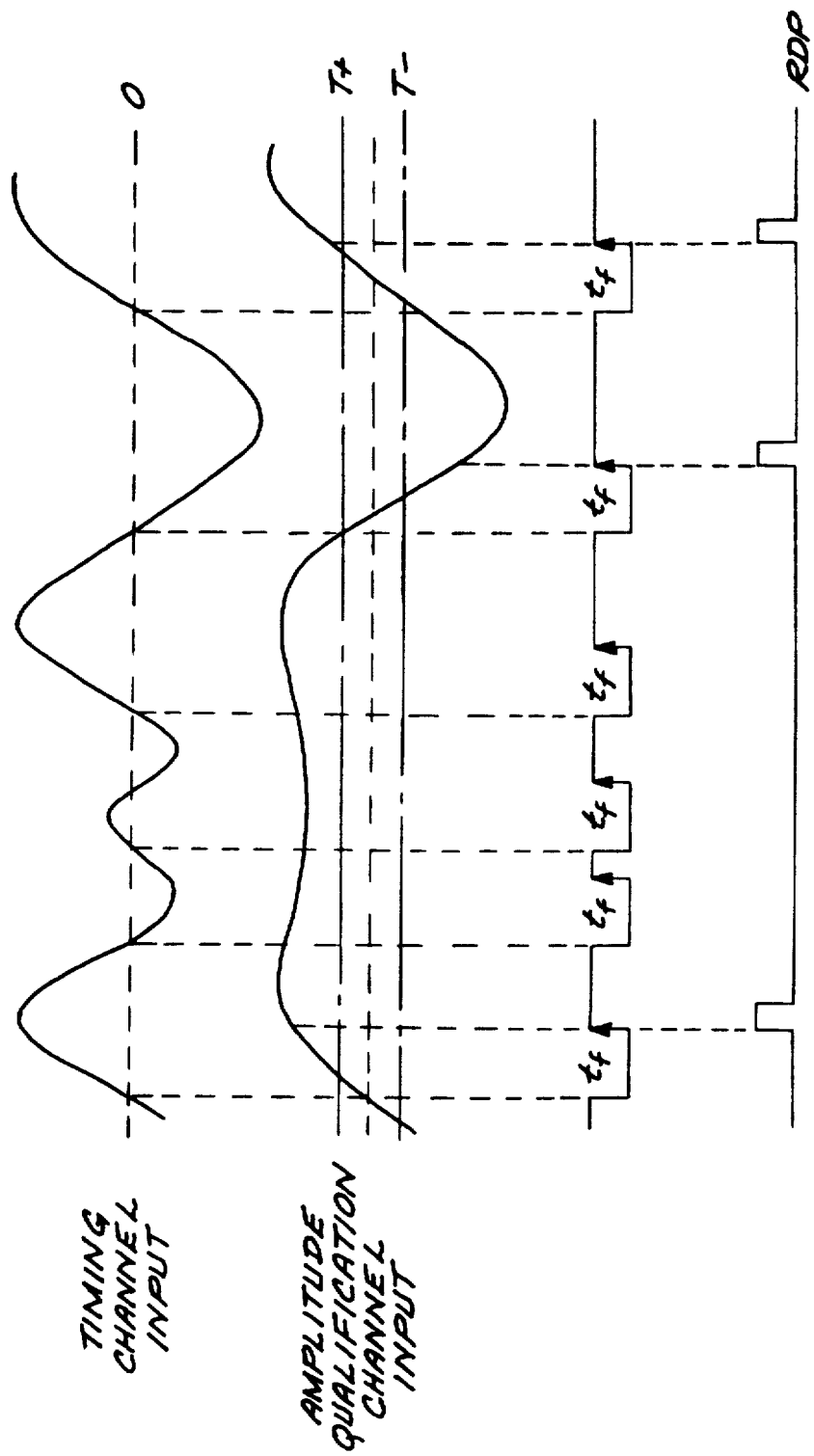
FIG. 6 schematically depicts the inputs to the time domain filter of the tape read circuit of FIG. 5 and is helpful in understanding the operation of the time domain filter.

FIG. 6 sets forth waveforms that represent the timing channel and amplitude qualification inputs to the time domain filter, and the generation of the RDP pulses pursuant to the amplitude and polarity of the amplitude qualification signal after a predetermined time interval $t_f$ following a zero crossing by the timing signal. It is noted that a zero crossing of the timing signal that occurs prior to when the predetermined time elapses for a preceding zero crossing is ignored.

Figure 7:
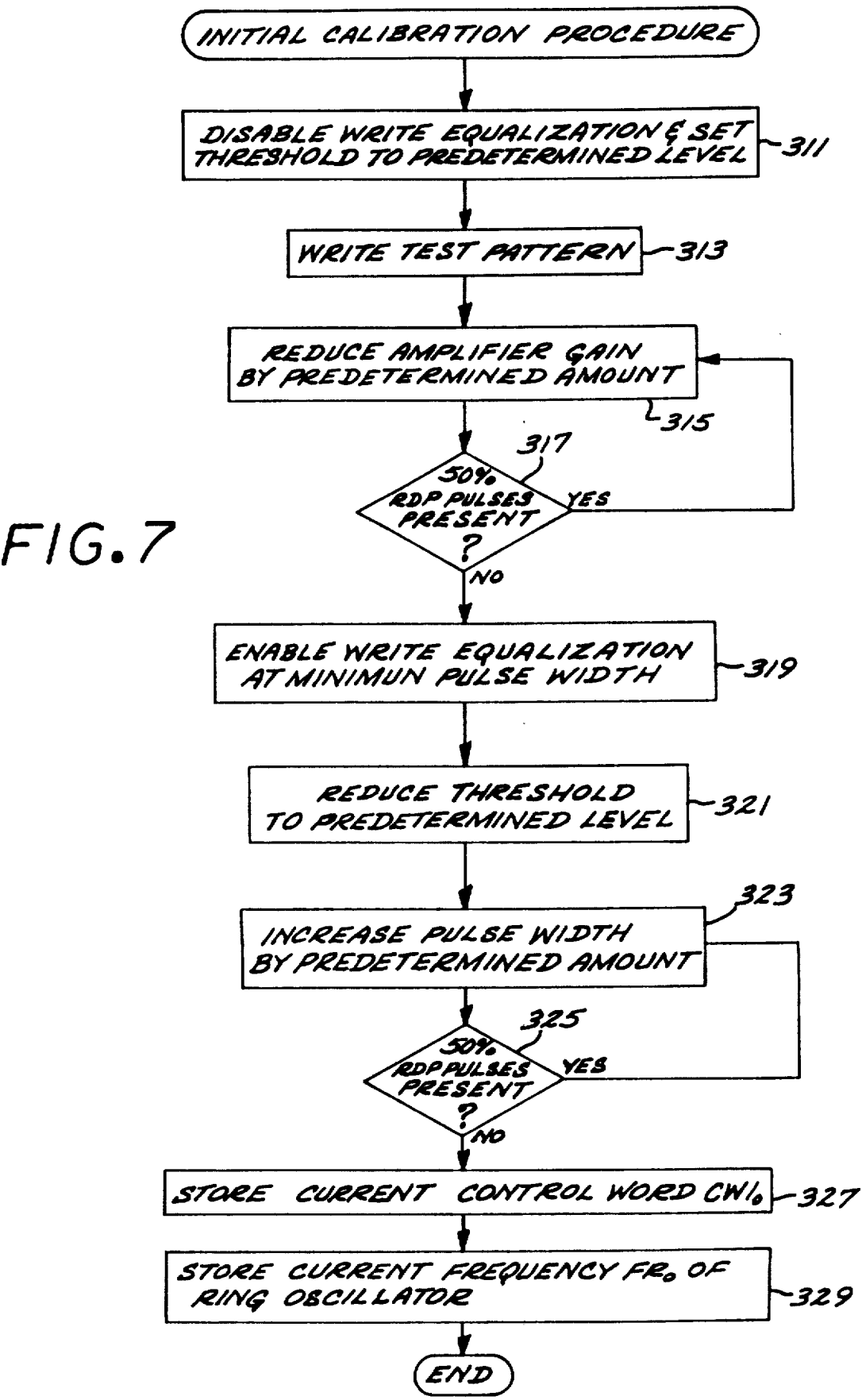
FIG. 7 is a flow diagram of a calibration process performed by the calibration circuit of FIG. 4.

Referring now to FIG. 7, set forth therein is a flow diagram of a calibration procedure performed by the processor 117 of the calibration circuit for determining the equalization pulse extending reference control value $CW1_o$ and the reference frequency $FR_o$ for achieving a desired suppression of the read signal. At 311 write equalization is disabled, the data delay control word CW2 is set to zero (i.e., no delay of the RLLDAT output signal), and the read threshold of the time domain filter is set to a predetermined level that for the particular implementation is considered to be optimum. For normalization purposes, that predetermined level is regarded as 100%. At 313 a repeating test pattern is written to tape, comprising for example the maximum number of 0's allowed by the particular RLL code and intervening 1's, which would produce the lowest fundamental frequency. The RDP pulses would occur at lowest fundamental frequency, and at 315 the gain of the amplifier 315 is reduced by a predetermined amount. At 317 a determination is made as to the number of RDP pulses being produced is 50% or more of the RDP pulses that would normally be produced pursuant to the test pattern on tape. If yes, the gain is again adjusted at 315. If no, the number of RDP pulses is not 50% or more of the RDP pulses that would normally be produced, the procedure transfers to 319. Essentially, the gain of the amplifier is reduced incrementally to slightly below the gain level that produces 50% of the RDP pulses that would normally be produced.

At 319 write equalization is enabled with the equalization pulses set at minimum width (i.e., CW1=0, CW2=αCW1=0, and thus no pulse stretching), and at 321 the threshold of the time domain filter is reduced to a predetermined level that corresponds to the desired suppression relative to 100%, which will cause all of the RDP pulses to be produced. At 323 the control width of the write equalization pulses is increased by increasing the control word CW1 by a predetermined amount and setting the control word CW2 to αCW1. At 325 a determination is made as to whether the number of RDP pulses being produced is 50% or more of the RDP pulses that would normally be produced pursuant to the test pattern on tape. If no, the number of RDP pulses has just fallen below 50% of the RDP pulses that would normally be produced, and at 327 the current value of the control word CW1 is stored as the equalization pulse reference control value $CW1_o$. At 329 the current frequency output of the ring oscillator is stored as the reference frequency $FR_o$. Essentially, the write equalization pulse width is increased to the width that is slightly greater than the minimum pulse width which would produce 50% of the RDP pulses for the predetermined time domain filter threshold set previously, and the control word associated with that increased width is utilized as the reference control value $CW1_o$.

It should be appreciated that while 50% is utilized as the threshold in the foregoing for setting amplifier gain and time domain threshold, some other amount can be utilized.

The foregoing calibration procedure calibrates only suppression, and is based on α having been determined, for example, by an initial factor calibration or design verification using equipment capable of measuring relative phase. This will typically be sufficient. However, if phase must also be calibrated, the read channel can be designed to allow, for example, measurement of relative amplitudes of successive peaks of the differentiated channel output of a low frequency waveform.

After the initial equalization pulse calibration is completed, data can be written to tape and the calibration circuit adjusts the control words CW1 and CW2 pursuant to the following equations to compensate for drift:

$$CW1 = CW_o \cdot (FR/FR_o) \quad \text{(Equation 9A)}$$

$$CW2 = a \cdot CW_o(FR/FR_o) = a \cdot CW1 \quad \text{(Equation 9B)}$$

where the control word reference value $CW_o$ and the reference frequency $FR_o$ are determined as described above.

The foregoing equations for maintaining the equalization pulse width constant is based on the following. From Equation 8 above, the reference frequency $FR_o$ is related to the reference value $K_o$ (which was the value of K when the reference frequency was determined) as follows:

$$FR_o = FR_{(nom)}/K_o \quad \text{(Equation 10)}$$

The width EQP_WIDTH of the EQP pulses includes the width EQN_WIDTH of the EQN pulses provided by the equalization timing circuit 13 and the delay provided by the multiple stage delay circuit as expressed in Equation 3 above:

$$EQP\_WIDTH = EQN\_WIDTH + CW1 \cdot d_{nom} \cdot K \quad \text{(Equation 11)}$$

The desired equalization pulse $EQ\_WIDTH_o$ determined pursuant to calibration is therefore:

$$EQP\_WIDTH_o = EQN\_WIDTH + CW1 \cdot d_{nom} \cdot K_o \quad \text{(Equation 12)}$$

Since $EQP\_WIDTH_o$ is the width to be maintained, the right sides of Equations 11 and 12 can be equated to provide:

$$CW1 \cdot d_{nom} \cdot K = CW1_o \cdot d_{nom} \cdot K_o \quad \text{(Equation 13)}$$

$$CW1 = CW1_o(K_o/K) \quad \text{(Equation 14)}$$

From Equations 8 and 10, $(K_o/K)$ can be expressed as $(FR/FR_o)$ to provide the following which is Equation 9 above for maintaining the width of the equalization pulses EQP:

$$CW1 = CW1_o(FR/FR_o) \quad \text{(Equation 14A)}$$

As discussed above, CW2=αCW1 and therefore the amount of movement of the leading edge is maintained constant with variations in voltage and temperature.

By way of illustrative example, the control words CW1 and CW2 are updated just prior to every time the write head is enabled. As stated previously, the initial equalization pulse calibration can be performed pursuant to manufacture or when a tape is to be written.

Pursuant to the operation of the calibration circuit, processing variations and magnetic deficiencies are compensated by the initial calibration which also compensates for write head variations, and voltage and temperature effects are compensated by the steady state calibration which is performed relative to the reference provided by the initial calibration.

Figure 8:
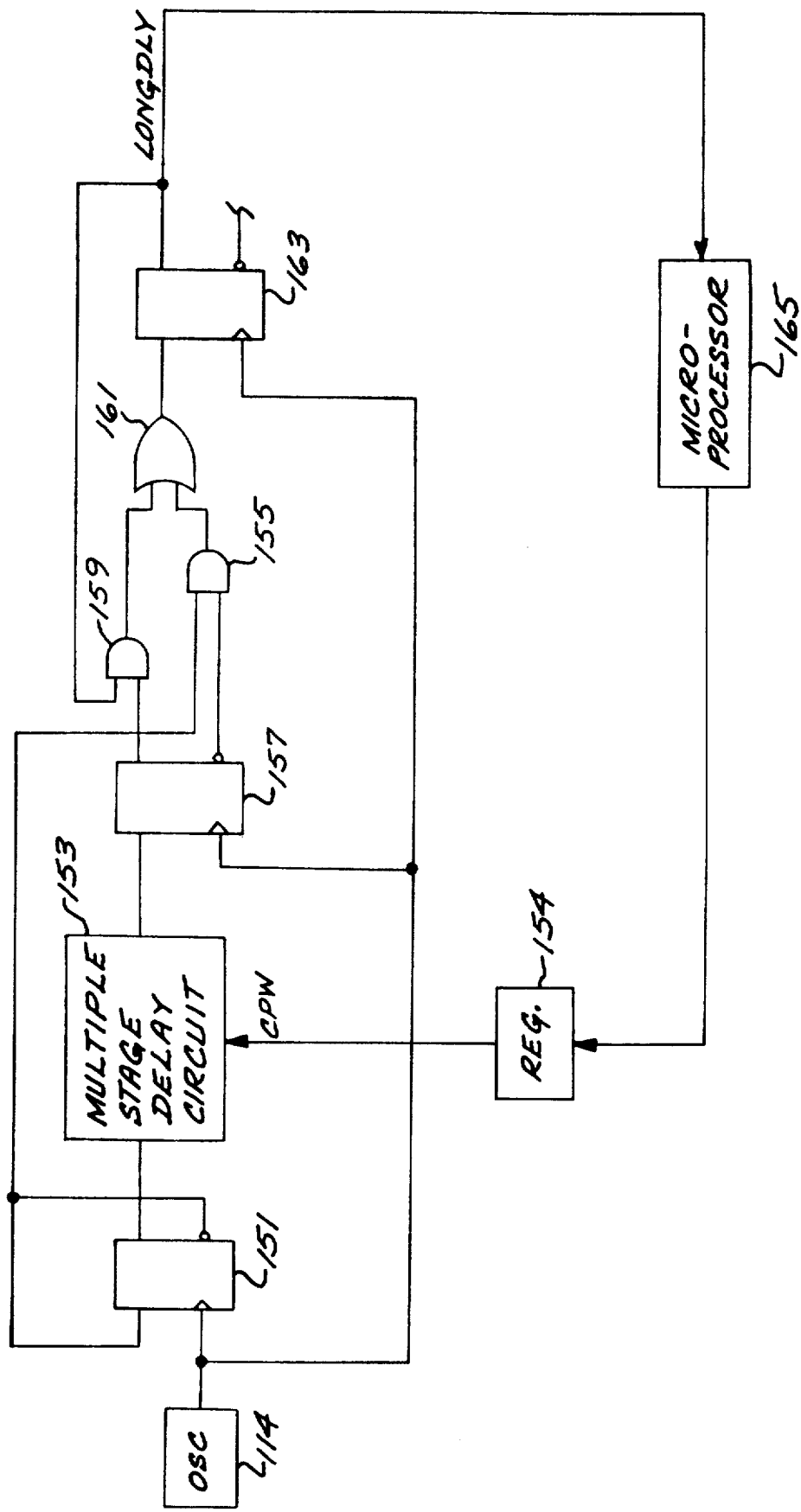
FIG. 8 is a schematic block diagram of a further illustrative example of an implementation of the calibration circuit of the write equalization circuit of FIG. 1.

Referring now to FIG. 8, set forth therein is a block diagram a further example of an implementation of the calibration circuit 23 which includes components that are implemented in the same integrated circuit as the multiple stage delay circuits 15, 22 of the equalization circuit of FIG. 1, as discussed more fully herein. The calibration circuit of FIG. 8 includes a flip-flop 151 which is clocked by a crystal oscillator clock source 114 that can comprise the crystal oscillator 14 in FIG. 1. The positive output of the flip-flop 151 is provided to a multiple stage delay circuit 153 which is similar to the multiple stage delay circuit 15 in FIG. 1, but with a longer total delay such that under reasonable conditions of process, temperature, and voltage, it will be capable of providing a delay that is at least one period of the clock output of the oscillator 114. The number of stages enabled in the multiple stage delay circuit 153 is controlled by the contents of a control register 154.

The negated output of the flip-flop 151 is fed back into the input of the flip-flop 151 and is further provided as one input to a two-input AND gate 155. The other input to the AND gate 155 is provided by the negated output of a flip-flop 157 which is clocked by the oscillator 114 and whose input is provided by the multiple stage delay circuit 153. The positive output of the flip-flop 157 provides an input to a two-input AND gate 159 whose output is provided as an input to an OR gate 161 which also receives an input from the AND gate 155. The output of the OR gate 161 provides the input for a flip-flop 163 which is clocked by the oscillator 114. The LONGDLY output of the flip-flop 163 is provided to a microprocessor 165 which adjusts the contents of the calibration circuit control register 154 and like the microprocessor 117 in FIG. 4 is configured to communicate with the read circuit 25 and the equalization circuit control register 17.

The flip-flop 151, the multiple stage delay circuit 153, the AND gate 155, the flip-flop 157, the AND gate 159, the OR gate 161, and the flip flop 163 are implemented in the same integrated circuit as the multiple stage delay circuits 15, 22 of the equalization circuit of FIG. 1.

The LONGDLY output of the flip-flop 163 is HI when the delay provided by the multiple stage delay circuit 15 is greater than one period of the clock output of the oscillator 114, and is LO when the delay provided by the multiple is less than such clock period. The propagation delay characteristics of the logic gates in the multiple stage delay circuit 153 can be detected by determining the smallest value that causes the LONGDLY signal to be HI, and such value is utilized by the microprocessor 165 for calibration procedure discussed above and for adjusting the control words CW1, CW2 of the write equalization circuit of FIG. 1. In this manner, the number of stages required for a fixed delay is determined, and that number of stages can vary with temperature and voltage.

For the calibration procedure, the procedure of FIG. 7 is followed, except that a calibration circuit reference control value $CPW_o$ is determined instead of a reference frequency. In particular, after the equalization circuit reference control value $CW1_o$ is stored at 327, the calibration circuit reference control value $CPW_o$ is determined by adjusting the control word CPW to the smallest value that causes LONGDLY to be HI, and that value of CPW is stored as the calibration circuit reference control value $CPW_o$.

For steady state operation, the equalization circuit control word CW1 is adjusted by the microprocessor 165 in accordance with the following equation pursuant to changes in the smallest value of CPW that causes LONGDLY to be HI:

$$CW1 = CW1_o \cdot (CPW/CPW_o) \quad \text{(Equation 15A)}$$

The foregoing equation is based on the same analysis as utilized above for Equation 9 which is utilized with the calibration circuit of FIG. 3 to adjust the equalization circuit control word CW1 pursuant to changes in the frequency of operation of the ring oscillator of the calibration circuit of FIG. 3.

The data delay control word CW2 is equal to $\alpha$CW1, and therefore the movement of equalization pulse leading edges remains substantially constant with changes in voltage and temperature.

Essentially, the calibration circuit of FIG. 8 indirectly detects changes in the propagation delay characteristics of the equalization circuit multiple stage delay circuits 15, 22 by directly detecting changes in the propagation delay characteristics of the calibration circuit multiple stage delay circuit 153 as manifested by change in the smallest value of the control word CPW that will cause LONGDLY to be HI.

Since the calibration circuit of FIG. 8 includes a multiple stage delay circuit, a single multiple stage delay circuit can be utilized in the write equalization circuit of FIG. 1 as implemented with calibration circuit of FIG. 8. The single multiple stage delay circuit would provide, pursuant to appropriate multiplexing circuitry at its input and output and appropriate control of the contents of its control word, the respective functions of (a) equalization pulse width control and (b) detection of propagation delay characteristics.

The foregoing has been a disclosure of write circuitry for a computer tape drive that compensates for processing variations and magnetic deficiencies by providing write equalization pulses having a width and location in bit intervals that are selected to achieve a desired suppression characteristic, and which further compensates for drift by maintaining the selected equalization width and location substantially constant with variations in temperature and voltage.

Although the foregoing has been a description and illustration of specific embodiments of the invention, various modifications and changes thereto can be made by persons skilled in the art without departing from the scope and spirit of the invention as defined by the following claims.

What is claimed is:

1. A write circuit for a computer tape drive, comprising:
    data means for producing a binary data signal having a series of bit intervals associated therewith, and wherein a 1 is represented by a transition at the start of a bit interval and a 0 is represented by no transition at the start of a bit interval;
    pulse generating means for producing reference pulses respectively synchronized with predetermined 0's in said binary signal; and
    adjustment means responsive to said binary data signal and said reference pulses for producing a composite write data signal that includes (a) a write binary signal that comprises a replica of said binary data signal, and (b) respective write equalization pulses in bit intervals of predetermined 0's in said write binary signal, wherein the width and location of the equalization pulses in bit intervals are adjusted to achieve a predetermined suppression and a predetermined phase characteristic.

2. The write circuit of claim 1 wherein said write equalization pulses are not centered in respective bit intervals.

3. The write circuit of claim 2 wherein said write equalization pulses are advanced relative to the center of respective bit intervals such that the write equalization pulse trailing edges are farther from center than the write equalization pulse leading edges.

4. The write circuit of claim 1 wherein said adjustment means comprises:
    controllable delay means responsive to said binary data signal for providing a delayed version of said binary data signal;
    controllable pulse extending means responsive to said reference pulses for producing extended equalization pulses having trailing edges that are extended beyond the trailing edges of said reference pulses;
    combining means for combining said delayed binary data signal with said extended equalization pulses to produce said write data signal; and
    control means for controlling said controllable delay means and said controllable pulse extending means to control the width and location of said equalization pulses in said write data signal to achieve said predetermined suppression and phase characteristic.

5. A write circuit for a computer tape drive, comprising:
   data means for producing a binary data signal having a series of bit intervals associated therewith, and wherein a 1 is represented by a transition at the start of a bit interval and a 0 is represented by no transition at the start of a bit interval;
   first multiple stage delay means responsive to said binary signal for providing a delayed binary signal;
   pulse generating means for producing nominal equalization pulses respectively synchronized with predetermined 0's in said binary signal;
   second multiple stage delay means responsive to said nominal equalization pulses for producing delayed nominal equalization pulses;
   means for combining said nominal equalization pulses and said delayed nominal equalization pulses to produce extended equalization pulses having trailing edges that are extended beyond the trailing edges of said nominal equalization pulses;
   means for combining said delayed binary data signal and said extended equalization pulses to produce a composite write data signal;
   control means for controlling said first and second multiple delay means to achieve equalization pulses having a width and location in bit intervals defined by said delayed binary data signal that provide a predetermined suppression and a predetermined phase characteristic, and to maintain the width and bit interval location of the equalization pulses substantially constant with variations in voltage and temperature.

6. The write circuit of claim 5 wherein said control means comprises:
   means for detecting changes in the propagation delay characteristics of said first and second multiple stage delay means; and
   means for adjusting the number of delay stages utilized in said first and second multiple stage delay means so as to maintain the width and location of said equalization pulses substantially constant.

7. The write circuit of claim 6 wherein:
   said first and second multiple stage delay means are implemented in an integrated circuit; and
   said means for detecting means comprises oscillating means implemented in the same integrated circuit as said first and second multiple stage delay means, said oscillating means providing an output frequency that varies with changes in the propagation delay characteristics of said first and second multiple stage delay means.

8. The write circuit of claim 7 wherein said oscillating means comprises a ring oscillator.

9. The write circuit of claim 6 wherein said first and second multiple stage delay means are implemented in an integrated circuit, and wherein said detecting means comprises:
   third multiple stage delay means having logic gates implemented in the same integrated circuit as said first and second multiple stage delay means; and
   logic means implemented in the same integrated circuit as said second multiple stage delay means for providing an indication of whether the delay provided by said second multiple delay means is less than or greater than a predetermined time reference;
   whereby said adjusting means adjusts the number of stages of said third multiple stage delay means to maintain a substantially constant relation between its delay and said predetermined time reference, and whereby the respective numbers of delay stages utilized in the first and second multiple stage delay means are adjusted on the basis of the number of stages of said third multiple stage delay means thus utilized.

10. The write circuit of claim 9 wherein the delays provided by the delay stages in said first and second delay means are substantially constant, and wherein the ratio between (a) the number of stages employed for delay in said first multiple stage delay means and (b) the number of stages employed for delay in said second multiple stage delay means is constant.

* * * * *

UNITED STATES PATENT AND TRADEMARK OFFICE
CERTIFICATE OF CORRECTION

PATENT NO. : 5,267,096
DATED : November 30, 1993
INVENTOR(S) : William A. Buchan et al.

It is certified that error appears in the above-indentified patent and that said Letters Patent is hereby corrected as shown below:

Column 3, line 52, "010000110010" should be --01000010010--.
Column 6, line 6, after "equalization" insert --pulse leading edges are effectively advanced by $\alpha\Delta t$--.
Column 13, line 18, "circuit 15" should be --circuit 153--.

Signed and Sealed this

Twenty-second Day of October, 1996

Attest:

BRUCE LEHMAN

Attesting Officer

Commissioner of Patents and Trademarks